US005184270A

United States Patent [19]

Boyd et al.

[11] Patent Number: 5,184,270

[45] Date of Patent: Feb. 2, 1993

[54] INTERNAL ARC GAP FOR SECONDARY SIDE SURGE PROTECTION AND DISSIPATION OF A GENERATED ARC

[75] Inventors: Edward L. Boyd; E. R. Eley, both of Athens, Ga.; Jeewan L. Puri, Venetia, Pa.

[73] Assignee: ABB Power T&D Company, Inc., Blue Bell, Pa.

[21] Appl. No.: 696,969

[22] Filed: May 8, 1991

Related U.S. Application Data

[63] Continuation-in-part of Ser. No. 538,035, Jun. 13, 1990.

[51] Int. Cl.$^5$ ..................... H02H 7/04

[52] U.S. Cl. ..................... 361/35; 361/40; 361/129

[58] Field of Search ..................... 361/38, 39, 40, 118, 361/137, 129, 35

[56] References Cited

U.S. PATENT DOCUMENTS

| | | | |
|---|---|---|---|
| 833,207 | 10/1906 | Frank | 361/40 |
| 1,271,407 | 7/1918 | Wolff | 361/40 |
| 1,923,727 | 8/1933 | Hodnette | 361/40 |
| 2,670,452 | 2/1954 | Yonkers et al. | 361/40 |
| 3,312,868 | 4/1967 | Vodicka | 361/118 |

*Primary Examiner*—A. D. Pellinen
*Assistant Examiner*—S. Jackson
*Attorney, Agent, or Firm*—Sixbey, Friedman, Leedom & Ferguson

[57] ABSTRACT

A system and device are disclosed for protecting the primary windings of a distribution transformer from surge current which exceed a predetermined level including a tank for accommodating the distribution transformer, a first expanding arc gap extending between a first terminal and a second terminal on the secondary side of the distribution transformer, and a second expanding arc gap extending between a third terminal and the second terminal on the secondary side of the distribution transformer. The arc gap being mounted within the gas space of the tank which accommodates the distribution transformer such that a surge current which exceeds the predetermined level is directed through the arc gaps and dissipated by the expanding arc gaps thereby bypassing the secondary windings in order to protect the primary windings of the distribution transformer. The internally mounted arc gaps being effective when applied to either interlaced or non-interlaced distribution transformers.

23 Claims, 5 Drawing Sheets

INTERNAL ARC GAP FOR SECONDARY SIDE SURGE PROTECTION AND DISSIPATION OF A GENERATED ARC

This application is a Continuation-In-Part application of U.S. application Ser. No. 538,035 filed Jun. 13, 1990.

TECHNICAL FIELD

The present invention relates to the protection of distribution transformers against lightning induced current surges, and more particularly to an internally mounted arc gap for protecting interlaced and non-interlaced distribution transformers from lightning induced surges in their secondary windings and for extinguishing the lightning induced arc.

BACKGROUND OF THE INVENTION

The reliability of distribution transformers under lightning conditions has been a long standing subject of concern for both the users of distribution transformers and distribution transformer manufacturers. Lightning induced current surges and induced voltage surges from lightning related phenomena can cause winding failures in the high voltage windings of a single phase distribution transformer. As is set forth in "Low-Voltage-Side Current-Surge Phenomena In Single-Phase Distribution Transformer Systems" *IEEE/PES T and D Conference and Exposition,* Paper 86T&D553-2, September 1986, R. C. Dugan and S. D. Smith:

1) customer load is more susceptible to damage due to lightning-induced voltages under light load conditions;

2) at a given loading, systems with interlaced transformers cause higher lightning-induced voltages across customer loads than appear in systems with noninterlaced transformers; and 3) applying arresters across the non-interlaced low-voltage winding will increase the lightning-induced voltages across the customer load to nearly the same level that occurs with an interlaced transformer.

These findings were made during a comprehensive study which demonstrated the significance of system parameters in lightning-induced surges in distribution transformers. Interlaced windings can in fact make a distribution transformer less susceptible to certain failures that can be induced by the secondary side current surges created by lightning strokes to either the primary system or the secondary system. However, the initial manufacturing cost of interlaced windings as well as future cost of losses of single phase distribution transformers incorporating interlaced windings are significantly greater than compared to non-interlaced low-voltage windings. This difference could amount to as much as one million dollars per year in total owning costs for a pole-mounted distribution transformer.

In an attempt to overcome the high cost associated with these interlaced windings in distribution transformers, lightning arresters have been applied across the two halves of the low-voltage windings of a non-interlaced distribution transformer in order to prevent the surge currents from entering the lowvoltage windings. Moreover, it has been found that the use of internally applied MOV arresters in combination with externally applied spark gaps do in fact protect the secondary side of non-interlaced distribution transformers from lightning-induced surge currents.

However, as with interlaced windings, internally applied MOV arresters are expensive and therefore, add significantly to the manufacturing costs, and subsequently to the owning costs of distribution transformers. Additionally, and more importantly, externally applied spark gaps applied at the X1 and X3 terminals of pole-mounted distribution transformers, while being cost effective, are relatively unreliable and could result in the systems inability to prevent surge current from entering the low-voltage windings of the distribution transformer. Externally mounted spark gaps which are applied at the X1 and X3 bushings of distribution transformers must be set during or shortly after the installation of the transformer, and if the externally mounted spark gap's air gap is not properly set or damaged due to handling of the transformers, the externally applied spark gap could be rendered ineffective. Moreover, because the externally mounted spark gaps are in fact mounted on that portion of the Xl and X3 terminals which extend outside the tank of the pole-mounted distribution transformer, these externally mounted spark gaps will be subjected to adverse environmental conditions which could readily render the externally mounted spark gap ineffective. This would then allow lightning-induced current surges to enter the low-voltage windings thereby possibly resulting in the failure of the primary winding of the distribution transformer.

Therefore, in view of the foregoing there is clearly a need for both an economical and reliable mechanism for bypassing the secondary side surge component of lightning-induced surges and induced voltage surges from lightning related phenomena around the low-voltage windings in order to prevent failures in the primary windings of distribution transformers, as well as protect against high-fault-current power follow. Moreover, while not only being reliable, such a mechanism must be capable of safely operating under severe transformer operating conditions.

SUMMARY OF THE INVENTION

A primary object of the present invention is to overcome the shortcomings associated with the above described mechanisms.

Another object of the present invention is to provide a reliable mechanism for bypassing secondary side surge current components around the low voltage windings of a distribution transformer in order to prevent failure in the primary windings of such distribution transformers. This is achieved by providing an internally mounted arc gap between the X1 and X2 terminals and the X3 and X2 terminals of a distribution transformer and more particularly, to position such arc gaps within the gas space of the distribution transformer.

Yet another object of the present invention is to provide a safe mechanism which when mounted within the gas space of a distribution transformer will not result in an unsafe operation of the transformer.

A further object of the present invention is to provide a mechanism for bypassing the secondary side surge current components of a lightning-induced current surge around the low-voltage windings thereby preventing failures in the primary windings of the distribution transformer without adding significantly to the overall manufacturing or owning costs of the distribution transformer.

Yet another object of the present invention is to provide an internally mounted arc gap between the X1 and X2 terminal and the X3 and X2 terminals of a distribution transformer and to provide a small gap to initiate an arc at a voltage low enough to protect the coil with such gap progressively expanding such that the initial arc is moved away from the small gap and increases in length t a point where an arc can no longer be sustained, thus protecting the assembly against high-fault-current power follow.

A further object of the present invention is to provide an internally mounted arc gap of an increasing spacial relationship such that an arc which is initiated at a narrow region of the gap is moved to a point where such arc can no longer be sustained and is disipated even at high fault currents.

These as well as further objects of the present invention are achieved by providing a system for protecting the primary windings of a distribution transformer from surge currents which exceed a predetermined level, the system including a tank for accommodating the distribution transformer, a first expanding arc gap extending between a first terminal and a second terminal on the secondary side of the distribution transformer, and a second expanding arc gap extending between a third terminal and the second terminal on the secondary side of the distribution transformer. The first and second arc gaps being mounted within a gas space of the tank which accommodates the distribution transformer such that a surge current which exceeds the predetermined level is initiated at a narrow portion of the first and second arc gaps and is subsequently moved away from the narrow portion of the first and second arc gaps along an increasingly widened section of the first and second arc gaps until an arc can no longer be sustained. Consequently, such surge current will bypass the secondary windings and the primary windings of the distribution transformer will be protected from the surge current.

These as well as additional advantages will become apparent from the following detailed description of the preferred embodiment and the several figures.

DETAILED DESCRIPTION OF A PREFERRED EMBODIMENT

Figure 1:
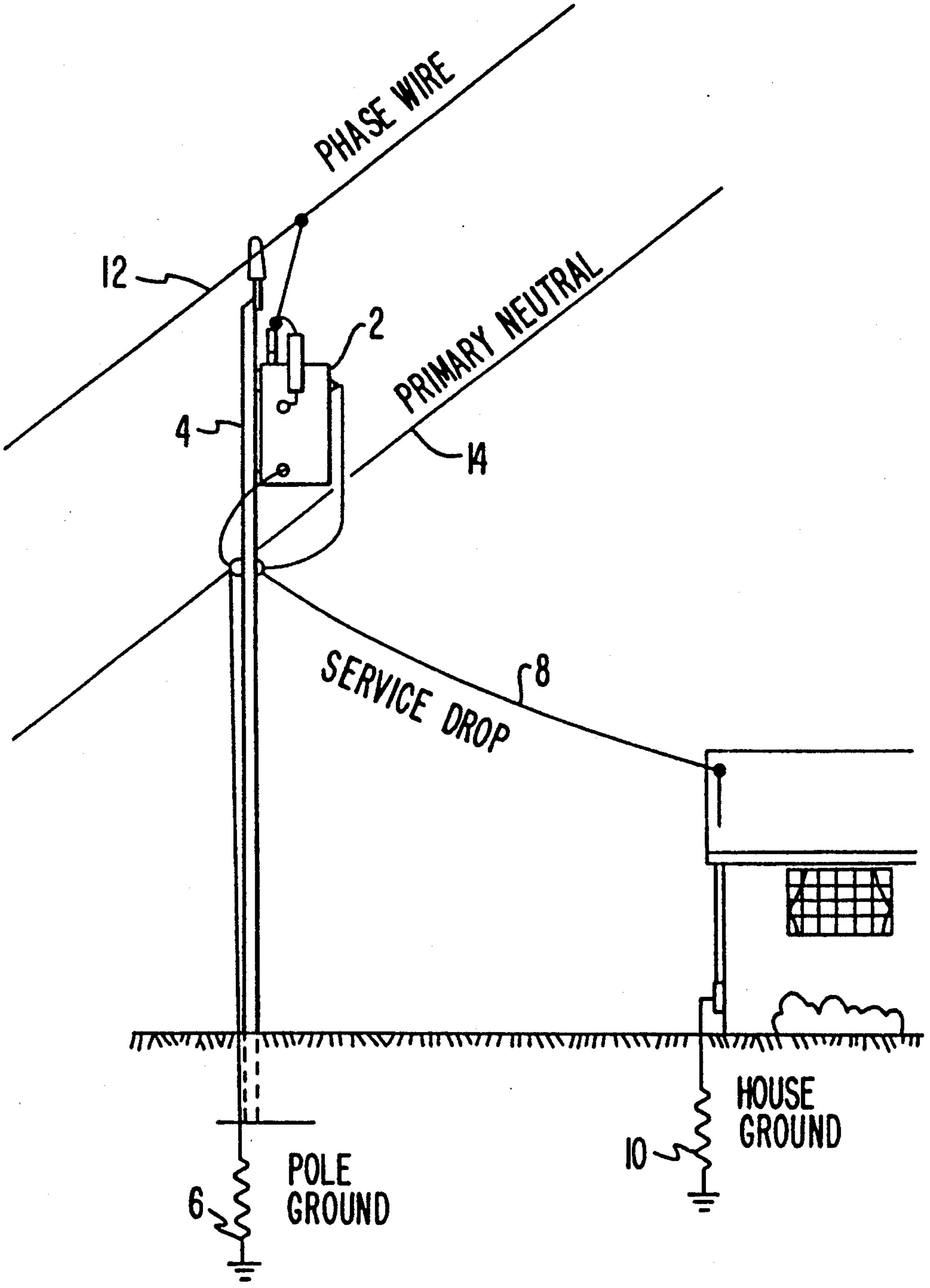
FIG. 1 is a schematic illustration of the overall structure of a single-phase system and distribution transformer to which the present invention may be readily adapted.

With the single-phase system and distribution transformer illustrated in FIG. 1, secondary side surges can be induced due to a lightning stroke on the primary side or on the secondary side of the distribution transformer. However, due to the height and exposure of the primary side system, the probability of occurrence of such a stroke on the primary side is 25 times greater than the probability of the occurrence of such a stroke on the secondary side. Consequently, the surge is most likely to originate on the high voltage rather than the low voltage line, however, such a surge can originate due to a lightning stroke on either the primary or the secondary side. As is schematically illustrated in FIG. 1 and diagrammatically illustrated in FIGS. 2A and 2B, the single-phase system includes a non-interlaced distribution transformer 2 conventionally mounted to a utility pole 4 and including both a pole ground 6 and service drop 8 extending from the distribution transformer 2. Also included in the schematic representation is a house ground 10, the significance of which will be discussed in greater detail herein below. The single phase system further includes a phase wire 12 and primary neutral wire 14 which interconnect a series of non-interlaced distribution transformers 10.

Figure 2A:
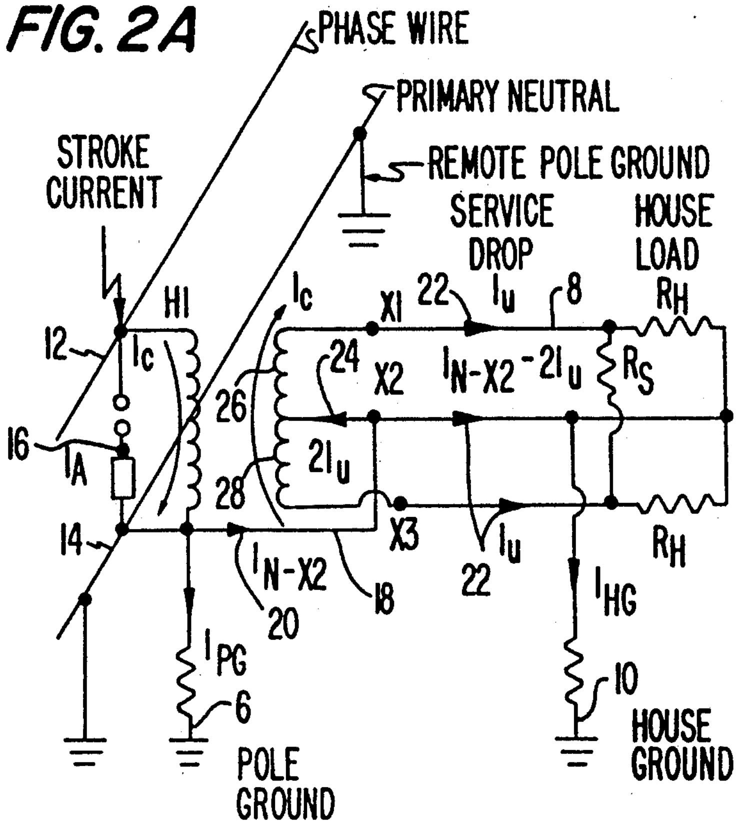
FIG. 2A is a diagrammatic representation of a single-phase system and non-interlaced distribution transformer illustrating the surge current travel throughout the system induced by a lightning stroke to the primary side system.

With reference now to FIG. 2A, in event of a lightning stroke to the primary side of the noninterlaced distribution transformer, a majority of the stroke current is initially conducted through the lightning arrester 16, with a portion of this current then escaping through the pole ground 6 with the remaining portion of the stroke current traveling through a common connection 18 in the direction of arrow 20 toward the secondary side of the non-interlaced distribution transformer and then finally through the service drop 8 in the direction of arrows 22 and into the house ground 10. It is during this occurrence that the lightning-induced surge current component in the common connection 18 enters the X2 terminal of the non-interlaced distribution transformer and flows in the opposite direction as illustrated by arrow 24 into the two halves of the low-voltage windings 26 and 28.

It is this surge current component that causes failures in the primary windings of the distribution transformer. It should be noted that the distribution of the surge current between the pole ground and the house ground is independent of the type of transformer employed and is solely dependent upon the relative magnitude of the pole ground and the house ground.

Figure 2B:
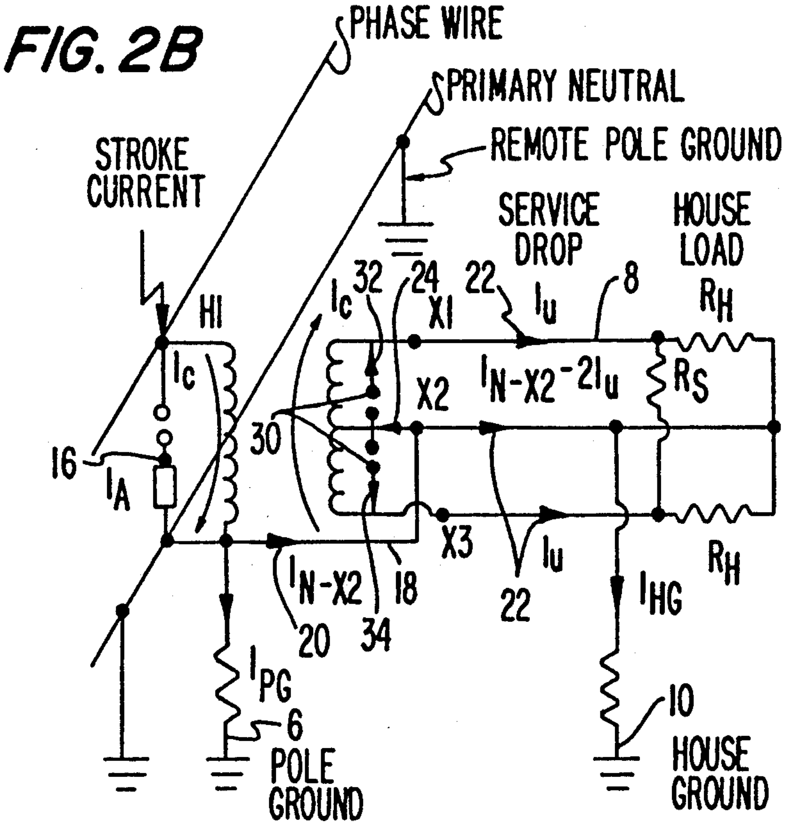
FIG. 2B is a diagrammatic representation of the system illustrated in FIG. 2A employing an internally mounted arc gap in accordance with the present invention.

Referring now to FIG. 2B, a diagrammatic representation of the single-phase system and noninterlaced distribution transformer employing the present invention will be discussed in detail. FIG. 2B is essentially identical to FIG. 2A in that in the event of a lightning stroke to the primary side of the non-interlaced distribution transformer a majority of the stroke current is conducted through the lightning arrester 16 with a portion of this stroke current escaping through the pole ground 6, with the remaining stroke current traveling through the common connection 18 in the direction of arrow 20 and then finally through the service drop 8 in the direction of arrows 22 and into the house ground 10. As with the previous system, the surge current component in the common connection enters the X2 terminal of the non-interlaced transformer and flows in the direction of arrow 24. However, unlike the previous system, the system illustrated in FIG. 2B is equipped with an internally mounted arc gap 30 between the X1 and X2 terminals and the X3 and X2 terminals. Consequently, in the event of a lightning stroke to the primary side of the transformer, the surge current if in excess of a predetermined value passing in the direction of arrow 24, will cross the arc gap in the direction of arrows 32 and 34 respectively. Therefore, by positioning this arc gap across the low-voltage windings of the noninterlaced transformer, the arc gap will act as a voltage sensitive switch which will close in the event of a surge current thereby bypassing the secondary side surge current components around the low-voltage windings in such a manner that failures in the primary windings of the non-interlaced transformer will be prevented.

Figure 4:
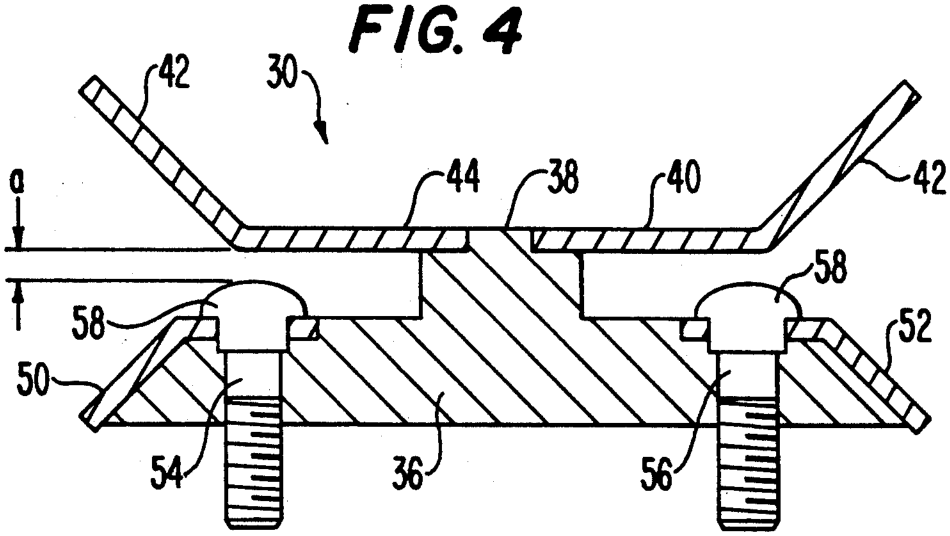
FIG. 4 is an elevational cross-sectional view of the internally mounted arc gap in accordance with the present invention.
Figure 5:
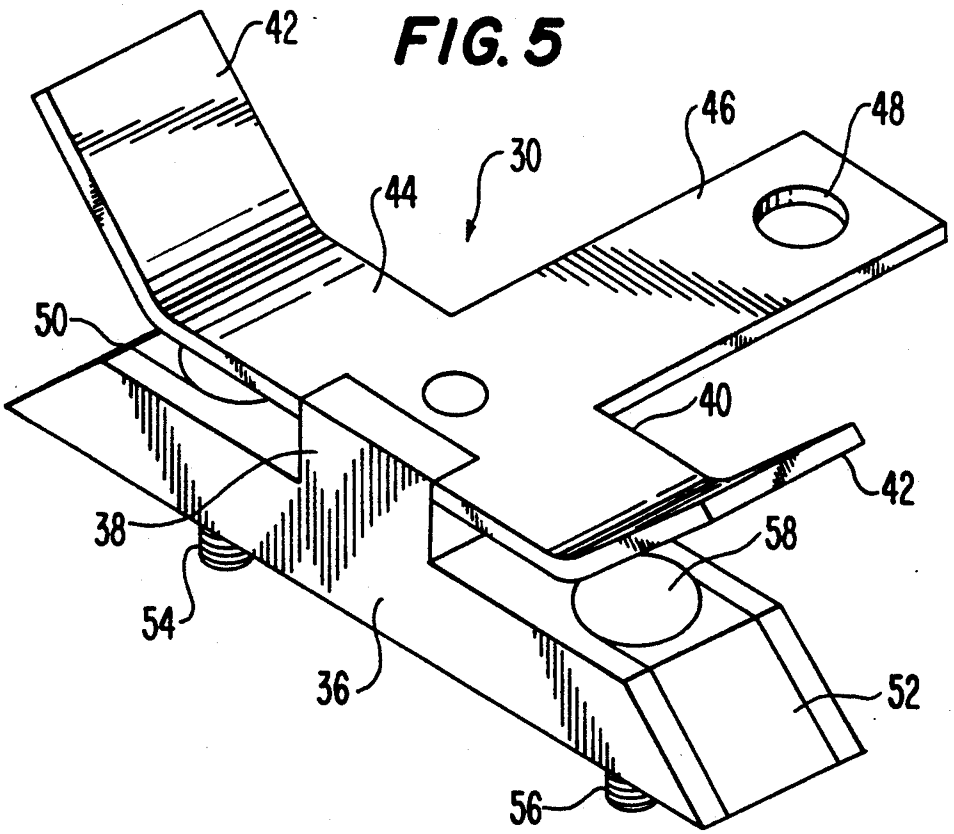
FIG. 5 is a perspective view of the internally mounted arc gap of FIG. 4 in accordance with the present invention.

Referring now to FIGS. 4 and 5, the particular structure of the arc gap 30 will be discussed in greater detail hereinbelow. The arc gap 30 includes a supporting structure 36 which is formed of any suitable non-conductive or insulating material, such as ceramic. The supporting structure 36 includes an upstanding raised central portion 38 of a non-conductive or insulating material for supporting an arcing plate 40 which is formed of any suitable conducting material. The portion 38 prevents the gaps of the arc gap structure from "seeing" one another and thus prevents an initial spark in one gap from jumping to the other gap.

The arc plate includes a pair of arcing horns 42 which extend at an angle from the flat portion of the arc plate 44 which is secured to the supporting structure 36. Also included in the flat portion 44 of the arc plate 40 is an extension 46 which is best illustrated in FIG. 5 and which includes opening 48 for securing to the X2 terminal of the non-interlaced transformer. Secured to the supporting structure 36 are conductive elements 50 and 52. These conductive elements being secured within the supporting structure by fastening elements 54 and 56, respectively. The fastening elements 54 and 56 are each secured to the respective X1 and X3 terminals of the non-interlaced transformer, the significance of which will be set forth in greater detail hereinbelow.

Each of fastening elements 54 and 56 include a raised upper portion 58 which provides for an arcing space a between such raised portion 58 and the plate 44. It is in this region that the initial arcing due to lightning induced surges takes place in order to prevent failures in the primary windings of the distribution transformer. In order to assure the protection of the primary windings, the arcing space a should be maintained at 0.1 to 0.2 inches. The particular dimension of the arcing space a is directly dependent upon the application of the arc gap and has been determined to be preferably, 0.172 inches.

It is in the arcing space a that the initial arc occurs between the raised upper portion 58 of the fastening elements and the flat portion 44 of the arcing plate 40. In the event of a lightning induced current surge, the initial arc will subsequently travel outward along the arcing horns 42 and the respective conductive elements 50 and 52 until such arc disipates in that the distance between the arcing horn 42 and the respective conducting element expands in a direction away from the initiation point of the arc.

Figure 6:
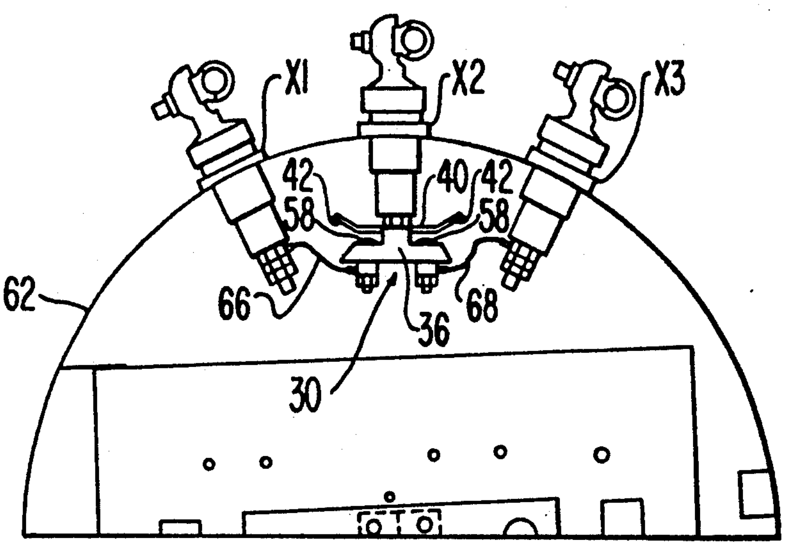
FIG. 6 is a top view of the internally mounted arc gap of FIGS. 4 and 5 mounted in the tank of a non-interlaced distribution transformer.
Figure 7:
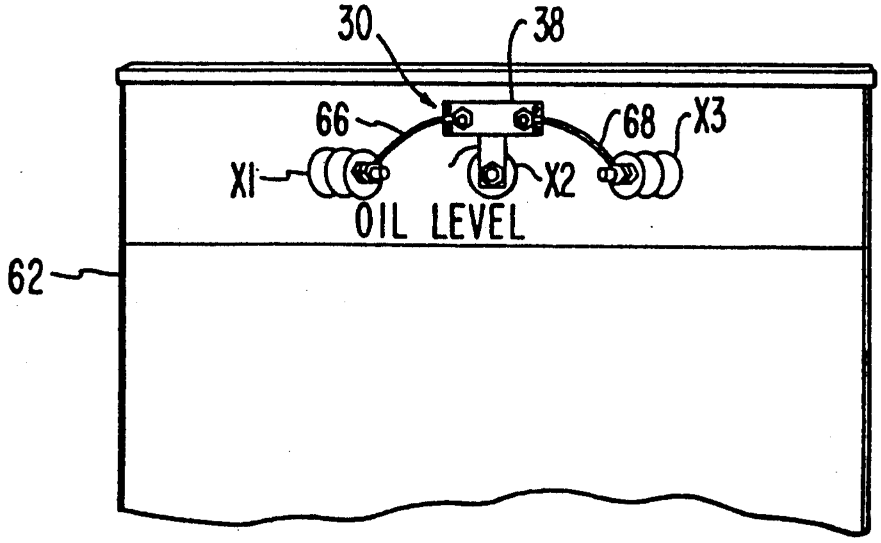
FIG. 7 is an elevational view of the internally mounted arc gap of FIGS. 4 and 5 positioned within the tank of a non-interlaced distribution transformer.

Turning now to FIGS. 6 and 7, the particular mounting of the arc gap assembly 30 within a tank 62 of a non-interlaced distribution transformer will be discussed in greater detail. The arc plate 40 is initially mounted to the X2 terminal of the noninterlaced transformer while the fastening elements 54 and 56 are attached to the X1 and X2, respectively, by way of leads 66 and 68. It should be noted that the arc gap assembly 30 is mounted in the gas space provided above the oil level within the tank of the non-interlaced distribution transformer. The arc gap is mounted such that the supporting structure 36 is positioned away from the oil of the non-interlaced distribution transformer in order that the arcing space between the flat portion 44 of the arc plate 40 and the rounded upper portions of the fastening elements where the arc originates is maintained as remote from the oil as possible.

Figure 3:
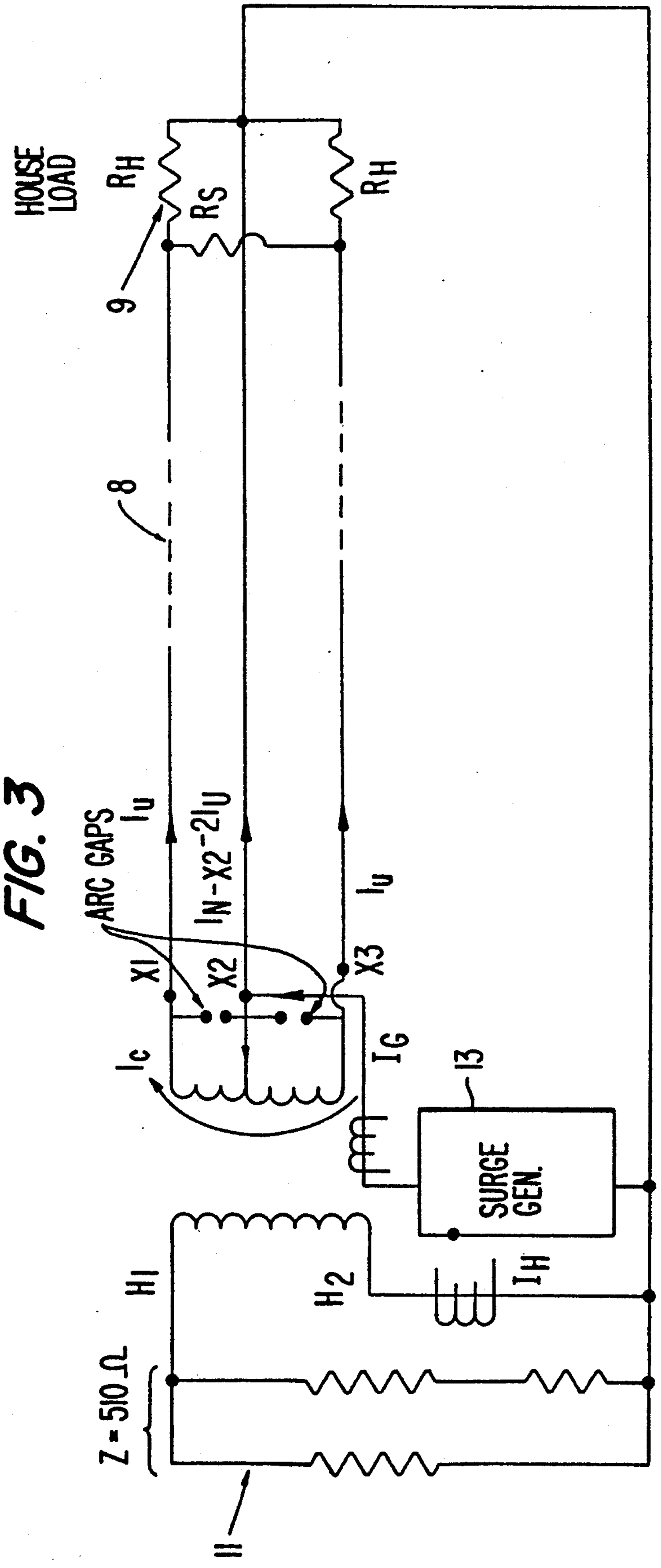
FIG. 3 is a diagrammatic representation of the test system for simulating lightning-induced surge currents to the primary side having an internally mounted arc gap between the X1 and X2 terminals and the X3 and X2 terminals of the secondary side of the noninterlaced distribution transformer in accordance with the present invention.

Having described the preferred embodiment of the invention, experimental data will now be set forth which demonstrates, that providing an internally mounted arc gap within a distribution transformer in accordance with the present invention will not result in a power failure even under extended overloaded conditions and more importantly, that the positioning of the arc gap assembly within the gas space of the distribution transformer will not result in a dangerous operation of the unit. A diagrammatic representation of the experimental system which was used in evaluating the internally mounted arc gap is set forth in figure 3. In order to produce realistic voltages across the secondary windings of the non-interlaced test transformer 7, each test specimen was connected to a 130 foot service drop 8, to a house load or customer load 9 on the secondary side and to a 510 ohm resistance 11 which simulates a typical surge impedance values on the primary side. The voltage pattern generated in the primary windings were also monitored for failure detection purposes and a surge current generator 13 was used to apply progressively increasing levels of surge currents at the X2 terminal. The experimental data obtained during these test procedures is set forth in Table I below.

TABLE I

LOW-SIDE SURGE TEST RESULTS

| SPECIMENS | | | | OBSERVATIONS | | | |
|---|---|---|---|---|---|---|---|
| Test Case | KVA | Household Load P.U. | LV Prot. | Surge Current (Amps.) | Voltage X1-X2 (KV) | Current into X2 (Amps) | Status |
| 1 | 10 | 1.93 | None | 4280 | 4.65 | 846 | P |
| | 10 | 1.93 | None | 6110 | 6.59 | 1666 | F |
| 2 | 10 | 0.96 | None | 7970 | 6.40 | 1128 | P |
| | 10 | 0.96 | None | 9720 | 7.77 | 1376 | F |
| 3 | 10 | 0.96 | Gaps | 11030 | 1.70 | * | P |
| 4 | 10 | 0.96 | Gaps | 12010 | 1.97 | * | P |
| 5 | 25 | 1.14 | None | 7420 | 6.90 | 2600 | P |
| | 25 | 1.14 | None | 8520 | * | * | F |
| 6 | 25 | 1.14 | Gaps | 12230 | 2.17 | * | P |
| 7 | 25 | 1.14 | MOV | 12230 | 1.68 | 1972 | P |
| 1 | 2 | 3 | 4 | 5 | 6 | 7 | 8 |

* Value indeterminate

As can be seen from the above experimental data, column 6 sets forth the voltages that were developed across the secondary windings when the surge currents of column 5 were applied at the X2 terminal. Further, as can be ascertained from the data recorded for specimens 3 and 4, when the arc gaps were present, a significant reduction in the voltages across the secondary windings were observed. Moreover, as is indicated by the value set forth in column 6, it is clear that in order to be effective under all loading conditions, an arc gap must be set to operate before a voltage level in the range of 4 to 6 kilovolts develops across the secondary windings of the transformer. It was further observed that a 10 KVA non-interlaced transformer failed with a current surge of 6,110 amps, while an identical specimen protected with the internally applied arc gap did not show any sign of failure when 12,010 amps of current surge were injected at the X2 terminal (this being the maximum generator capacity). Additionally, similar results were also observed on the 25 KVA non-interlaced transformer when provided with an internally mounted arc gap on the secondary winding. Therefore, in view of the above figures, it is clear that internally applied arc gaps significantly increase the surge current withstanding capability of both 10 and 25 KVA non-interlaced distribution transformers. Additionally, with the arc gap assembly of the present invention, because the initial arc is moved outwardly away from the narrow arcing space a to a point where such arc disipates, the arc gap assembly itself is protected against high-fault-current power follow. Such power follow could melt the arc gap assembly and cause excessive pressure buildup within the transformer if the arc were not so disipated.

Table II sets forth comparative test data between the internal arc gap set in copending U.S. application Ser. No. 538,035 (GAP I) and the internal arc gap of the present invention including arcing horns 42 (GAP II). The single gap test being carried out across only one of the two arc gaps of the respective assembly and the series gap test being carried out across both arc gaps of the respective assembly.

TABLE II

POWER FOLLOW TEST RESULTS

| Test | GAP I | GAP II |
|---|---|---|
| 120 V Single Gap | Pass 23.8 Ka | Pass 23.8 Ka |
| 240 V Single Gap | Pass 23.0 Ka | Pass 23.0 Ka |
| 480 V Series Gap | Pass 10.0 Ka<br>Fail 15 Ka | Pass 24.0 Ka |

As can be seen from the foregoing, by use of the arc gap assembly in accordance with the present invention, an arc which initiates in the arc gap moves outwardly and disipates due to the increased spacing between the arcing horns 42 and the respective conductive element 50, 52 thus protecting the non-interlaced distribution transformer against high-fault-current power follow.

In addition to the above testing procedures, a distribution transformer having an internally mounted arc gap mounted therein was simulated and tested to ensure that the use of an internally mounted arc gap will not result in an unsafe operation of the transformer. In order to do so, two liters of transformer oil were sealed in a container leaving a 25 percent gas space. This 25 percent gas space was used because such is the maximum value of the gas space that will be present in a commercial oil distribution transformer. Further, the two liters of oil used in this experiment were saturated with air in order to simulate a condition which could exist in a transformer due to repeated exposure of the oil during the tap changing operation or during routine maintenance procedures. The container was then equipped with an arc gap assembly and pressure and temperature measuring devices. The entire container was then placed in an oven and the temperature raised to 150° C. Operation of the arc gap within this environment gave no indication of an explosion or any pressure surge in the vessel. Accordingly, it may be concluded that the operation of the arc gap in the gas space of a distribution transformer will not result in an unsafe operation of the unit.

While the invention has been described with reference to a preferred embodiment, it will be appreciated by those skilled in the art, that the invention may be practiced otherwise than as specifically described herein without departing from the spirit and scope of the invention. It is therefore to be understood that the spirit and scope of the invention be limited only by the appended claims.

INDUSTRIAL APPLICABILITY

Internally mounted arc gaps as set forth in the foregoing detailed description may be applied to all transformers. Because the arc gaps can be installed and set in the factory without requiring any readjustments during the operating life of the transformer and the location of the arc gap within the transformer tank the protection characteristics of the arc gaps are insensitive to atmospheric conditions as well as mishandling of the transformers during installation. The above-described internally mounted arc gaps may be readily applied in both interlaced and non-interlaced distribution transformers, and may be used in pole-mounted, as well as pad-mounted distribution transformers.

We claim:

1. A system for protecting the primary windings of a distribution transformer from surge currents which exceed a predetermined level, said system comprising:

a tank for accommodating the transformer, said tank including a gas space therein;

a first expanding arc gap extending between a first terminal and a second terminal on a secondary side of the transformer; and a second expanding arc gap extending between a third terminal and said second terminal on the secondary side of the transformer, wherein said first and second arc gaps are positioned in and exposed to said gas space of said tank such that a surge current which exceeds said predetermined level will bypass secondary windings of the transformer.

2. The system as defined in claim 1, wherein said first and second arc gaps include a supporting means for supporting said first and second arc gaps, an arcing plate fixedly secured to said supporting means, first and second arcing pins supported by said supporting structure connected to said first and third terminals, respectively, such that said first arc gap is formed by said first arcing pin and said arcing plate and said second arc gap is formed by said second arcing pin and said arcing plate.

3. The system as defined in claim 2, wherein a predetermined space is provided between said arcing pins and said arcing plate.

4. The system as defined in claim 3, wherein said arching plate includes at least one arcing horn extending from said predetermined space between said arcing pins and said arcing plate.

5. The system as defined in claim 4, wherein said supporting structure includes at least one conductive means extending from said predetermined space such that said arcing horn and said conductive means diverge from one another away from said predetermined space.

6. The system as defined in claim 5, wherein said arcing plate includes two arcing horns and said supporting structure includes two conductive means with respective arcing horns and conductive means extending from each of said first and second arc gaps.

7. The system as defined in claim 3, wherein said predetermined spacing is in the range of 0.1 to 0.2 inches.

8. The system as defined in claim 2, wherein said arcing plate is formed of a conductive material.

9. The system as defined in claim 2, wherein said supporting means is formed of a non-conductive material.

10. The system as defined in claim 1, wherein the distribution transformer is a non-interlaced distribution transformer.

11. The system as defined in claim 1, wherein the distribution transformer is an interlaced distribution transformer.

12. A distribution transformer enclosed within a distribution transformer tank having a gas space enclosed therein, comprising:

a protection means mounted within and exposed to the gas space of the transformer tank for protecting the primary windings of the distribution transformer from surge currents which exceed a predetermined level, said protection means including;

a first arc gap;

a second arc gap; and a dissipation means for dissipating an arc which spans at least one of said first and second arc gaps;

wherein a surge current which exceeds said predetermined level flows through said first and second arc gaps and is dissipated by said dissipating means thereby bypassing secondary windings of the distribution transformer.

13. The distribution transformer as defined in claim 12, wherein said first arc gap is positioned between a first terminal and a second terminal on a secondary side of the distribution transformer, and said second arc gap is positioned between said second terminal and a third terminal on said secondary side of the distribution transformer.

14. The distribution transformer as defined in claim 12, wherein the distribution transformer is a non-interlaced distribution transformer.

15. The distribution transformer as defined in claim 12, wherein the distribution transformer is an interlaced distribution transformer.

16. The distribution transformer as defined in claim 12, wherein said protection means further includes a supporting means for supporting said first and second arc gaps, an arcing plate fixedly secured to said supporting means, first and second arcing pins supported by said supporting structure connected to said first and third terminals, respectively, such that said first arc gap is formed by said first arcing pin and said arcing plate and said second arc gap is formed by said second arcing pin and said arcing plate.

17. The distribution transformer as defined in claim 17, wherein a predetermined space is provided between said arcing pins and said arcing plate.

18. The distribution transformer as defined in claim 18, wherein said arching plate includes at least one arcing horn extending from said predetermined space between said arcing pins and said arcing plate.

19. The distribution transformer as defined in claim 19, wherein said supporting structure includes at least one conductive means extending from said predetermined space such that said arcing horn and said conductive means diverge from one another away from said predetermined space.

20. The distribution transformer as defined in claim 19, wherein said arcing plate includes two arcing horns and said supporting structure includes two conductive means with respective arcing horns and conductive means extending from each of said first and second arc gaps.

21. The distribution transformer as defined in claim 17, wherein said predetermined spacing is in the range of 0.1 to 0.2 inches.

22. The distribution transformer as defined in claim 16, wherein said arcing plate is formed of a conductive material.

23. The distribution transformer as defined in claim 16, wherein said supporting means is formed of a non-conductive material.

* * * * *